(12) United States Patent
Tsai

(10) Patent No.: US 11,256,139 B2
(45) Date of Patent: Feb. 22, 2022

(54) SUPPORT PIN HAVING BRIGHTNESS ENHANCEMENT STRUCTURES AND BACKLIGHT MODULE WITH THE SAME

(71) Applicant: AmTRAN Technology Co., Ltd., New Taipei (TW)

(72) Inventor: Tsung-Ying Tsai, Yilan County (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/121,704

(22) Filed: Dec. 14, 2020

(65) Prior Publication Data

US 2021/0349351 A1  Nov. 11, 2021

(30) Foreign Application Priority Data

May 11, 2020  (TW) .................................. 109115619

(51) Int. Cl.
*G02F 1/13357* (2006.01)
*G02F 1/1335* (2006.01)

(52) U.S. Cl.
CPC .. *G02F 1/133611* (2013.01); *G02F 1/133606* (2013.01); *G02F 1/133608* (2013.01); *G02F 1/133607* (2021.01)

(58) Field of Classification Search
None
See application file for complete search history.

(56) References Cited

U.S. PATENT DOCUMENTS

2010/0073906 A1*  3/2010  Shen ................. G02F 1/133608
                                                                362/97.1
2015/0085520 A1*  3/2015  Liu .................... G02F 1/133606
                                                                362/606

FOREIGN PATENT DOCUMENTS

| CN | 201004138 Y | 1/2008 |
| CN | 103424926 A | 12/2013 |
| CN | 203797465 U | 8/2014 |
| CN | 103090266 B | * 12/2015 |
| CN | 105785644 A | 7/2016 |
| CN | 109633981 A | 4/2019 |
| KR | 20100101268 A | 9/2010 |
| TW | I537647 B | 6/2016 |
| TW | I686633 B | 3/2020 |
| TW | I686650 B | 3/2020 |

* cited by examiner

*Primary Examiner* — Britt D Hanley
(74) *Attorney, Agent, or Firm* — CKC & Partners Co., LLC

(57) ABSTRACT

A support pin supporting at least one optical component in an optical cavity includes a supporting base and a supporting section connecting the supporting base. The supporting section is made of a light-transmitting material. A plurality of grooves are integrally formed on the supporting section. The grooves reflect or refract part of incident light transmitted inside the supporting section diffusely and do not penetrate the supporting section. In addition, a backlight module and a display device with the support pins are also disclosed herein.

17 Claims, 4 Drawing Sheets

SUPPORT PIN HAVING BRIGHTNESS ENHANCEMENT STRUCTURES AND BACKLIGHT MODULE WITH THE SAME

RELATED APPLICATIONS

This application claims priority to Taiwan Application Serial Number 109115619, filed May 11, 2020, the disclosures of which are incorporated herein by reference in their entireties.

TECHNICAL FIELD

The present disclosure generally relates to the structure of support pins. More particularly, the present disclosure relates to the structure of support pins used in a backlight module for brightness enhancement.

BACKGROUND

The backlight source designed for current liquid crystal display products on the market is mostly direct-lit backlight module or edge-lit backlight module. Since the trend in liquid crystal display products is towards larger size, higher picture quality and thinner thickness, how to improve the production quality and efficiency, such that the best picture quality and the reduced production costs can both be achieved in the liquid crystal display products, is the critical issue in the industry of liquid crystal displays.

In a direct-lit backlight module, the diffuser is usually supported by support pins, wherein the numbers and positions of the support pins are designed based on the size of the display panel and the backlight module. The support pins are installed among the backlight sources and support the diffuser to ensure that the diffuser does not bend or deform due to weight. Without supports to the diffuser, the actual height of the optical cavity within the backlight module may vary, due to the deformation of the diffuser, and cannot meet the design requirements, which will cause uneven brightness issues, such as dim regions shown on the display panel. However, the prior art support pins affect the light transmission paths to the diffuser in the optical cavity, and eventually cause circular shadows shown on the display panel at the positions where the tips of the support pins contact the diffuser. Such shadows are conspicuous when the high-brightness images are displayed on the display screen and the picture quality will therefore be affected. In the liquid crystal displays incorporating high resolutions display technologies, e.g. the High Dynamic Range Imaging (HDR), the backlight modules are required to produce higher brightness for displaying high contrast pictures on the display panels, such that more realistic images or video can be watched by the audience. Therefore, the prior art support pins cause more obvious picture defects on such high-quality LCD displays.

Therefore, a new design of the support pins which solves the above-mentioned problem and the backlight module with such new support pins are deeply needed in the industry of LCD displays.

SUMMARY

One objective of the embodiments of the present invention is to provide a brightness enhancement support pin able to improve the brightness of the backlight module at the position of the brightness enhancement support pin and uniform the brightness of the liquid crystal display so as to improve the image quality of the liquid crystal display.

To achieve these and other advantages and in accordance with the objective of the embodiments of the present invention, as the embodiment broadly describes herein, the embodiments of the present invention provides a support pin utilized to support at least one optical component in an optical cavity, which includes a supporting base and a supporting section made of a light-transmitting material connecting the supporting base. A plurality of grooves are integrally formed on surfaces of the supporting section, which do not penetrate the supporting section, and the grooves diffusely reflect or refract part of incident light transmitted inside the supporting section.

According to another aspect of the present invention, there is provided a backlight module including a back plate, a plurality of foregoing support pins and a plurality of optical films. The optical films are supported by the support pins that a distance is kept between the optical films and the back plate.

According to further another aspect of the present invention, there is provided a display device including a display panel and a foregoing backlight module.

In some embodiments, the part of the light rays is reflected or refracted in the interior of the supporting section by the grooves and exits the supporting section toward a supporting section tip of the supporting section.

In some embodiments, the supporting section includes a first surface and a second surface, and the grooves are respectively formed on the first surface and the second surface.

In some embodiments, the first surface includes a first groove, a third groove and a fifth groove, and the second surface comprises a second groove, a fourth groove and a sixth groove.

In some embodiments, the grooves are cross symmetrically formed on surfaces of the supporting section.

In some embodiments, the grooves are respectively spaced apart from an end surface of the supporting section by a predetermined distance.

In some embodiments, the grooves include curved groove terminal portions.

In some embodiments, a part of the grooves is formed on the first surface with different slopes.

In some embodiments, the optical films include a diffuser and a prism sheet set.

In some embodiments, the prism sheet set includes an upper prism sheet and a lower prism sheet.

Hence, the brightness enhancement support pin equipped with the grooves can effectively reduce the quantity of the light rays reflected to the supporting base, thereby avoiding the dark shadow caused by the support pin and improving the image quality of the backlight module and the liquid crystal display.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
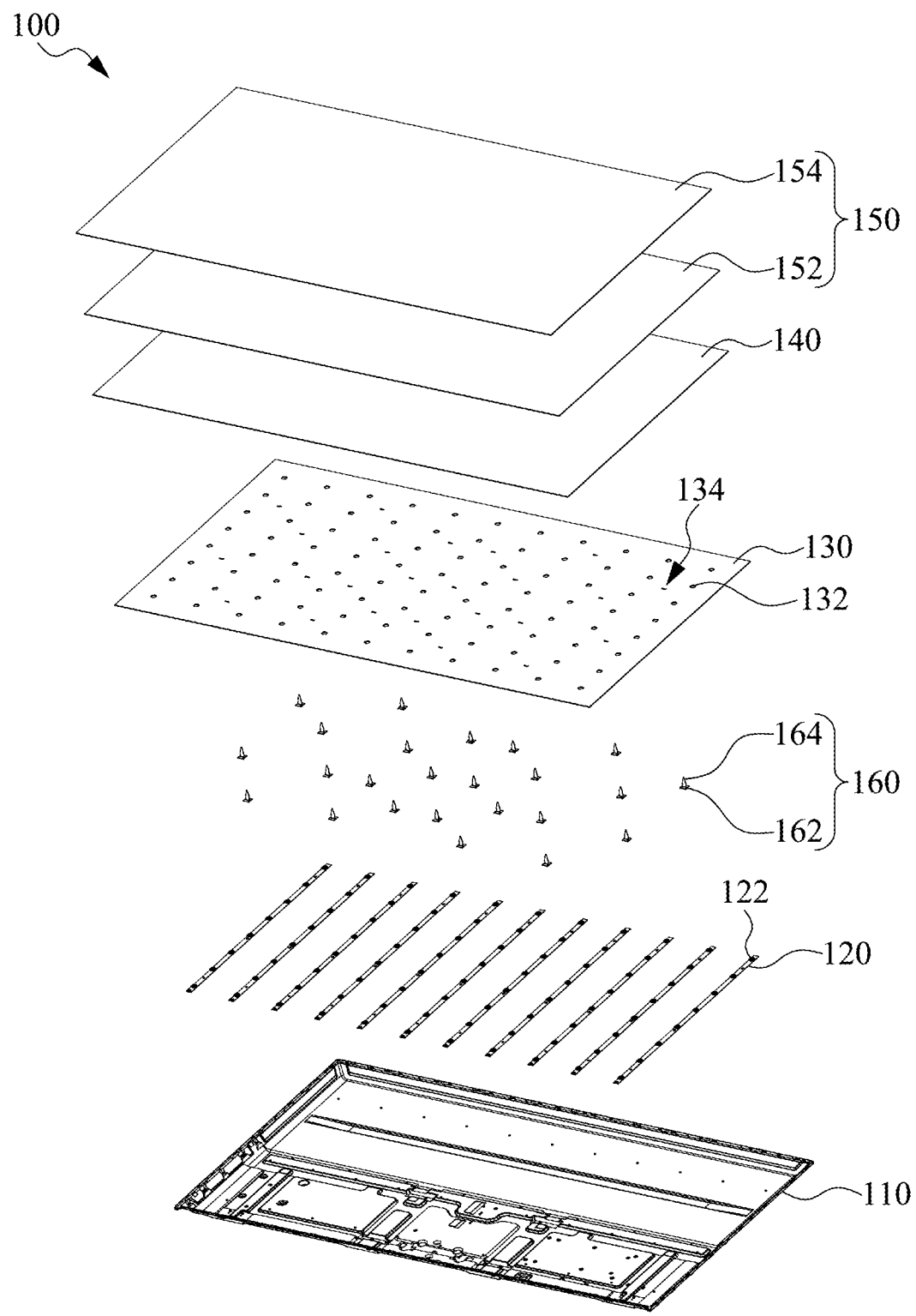
FIG. 1 illustrates a schematic exploded diagram showing a backlight module equipped with brightness enhancement support pins according to one embodiment of the present invention.
Figure 2:
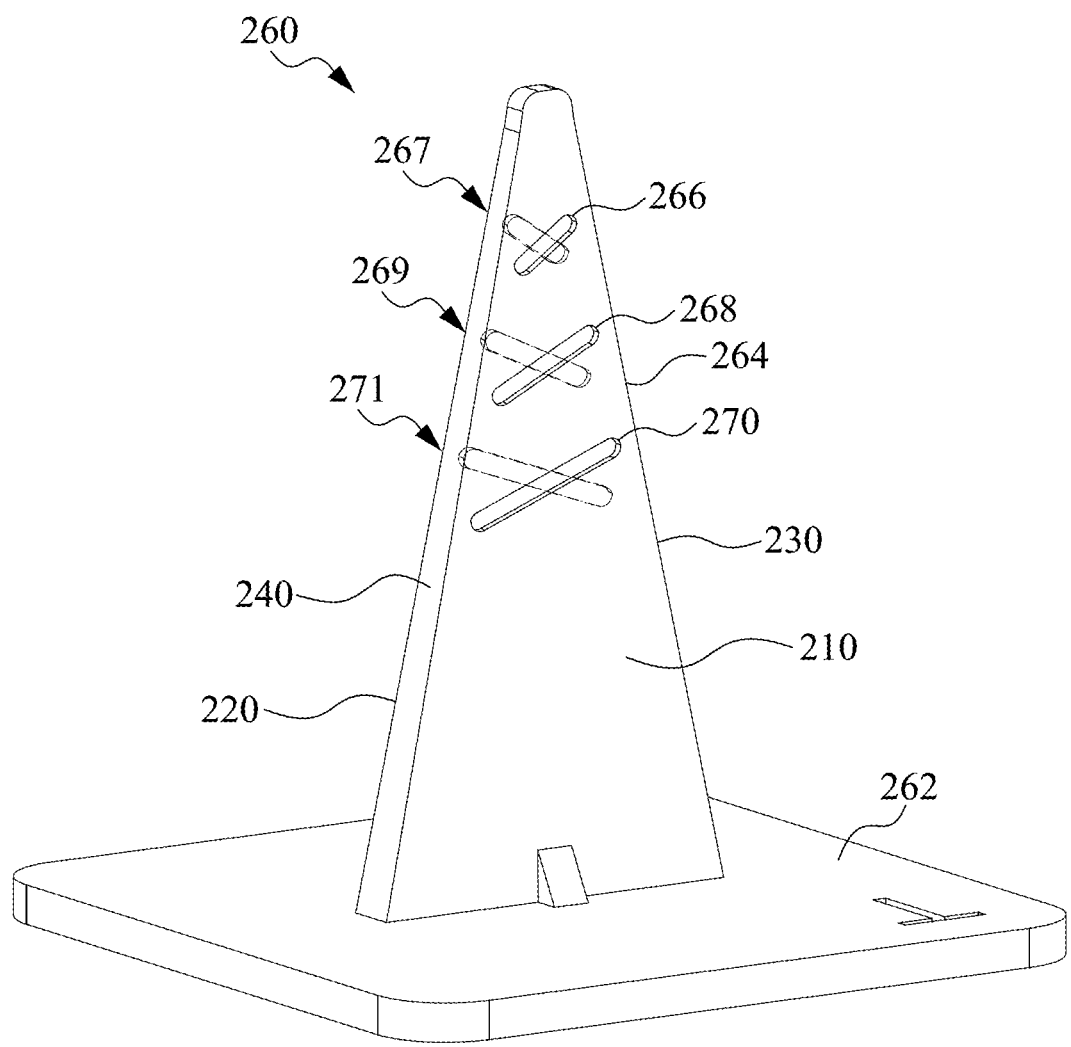
FIG. 2 illustrates a schematic perspective diagram showing a brightness enhancement support pin according to one embodiment of the present invention.
Figure 3:
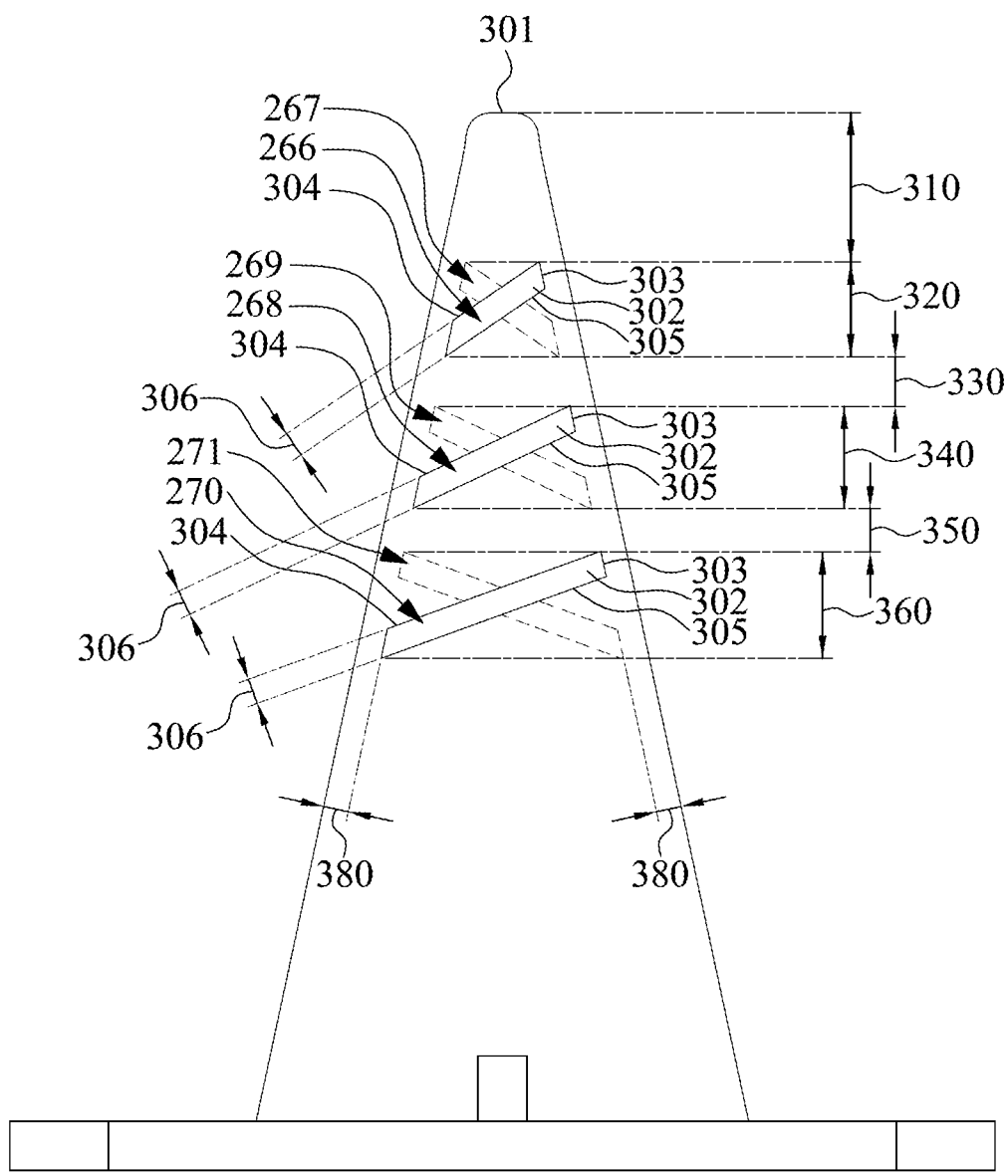
FIG. 3 illustrates a dimensional diagram of a brightness enhancement support pin according to one embodiment of the present invention.
Figure 4:
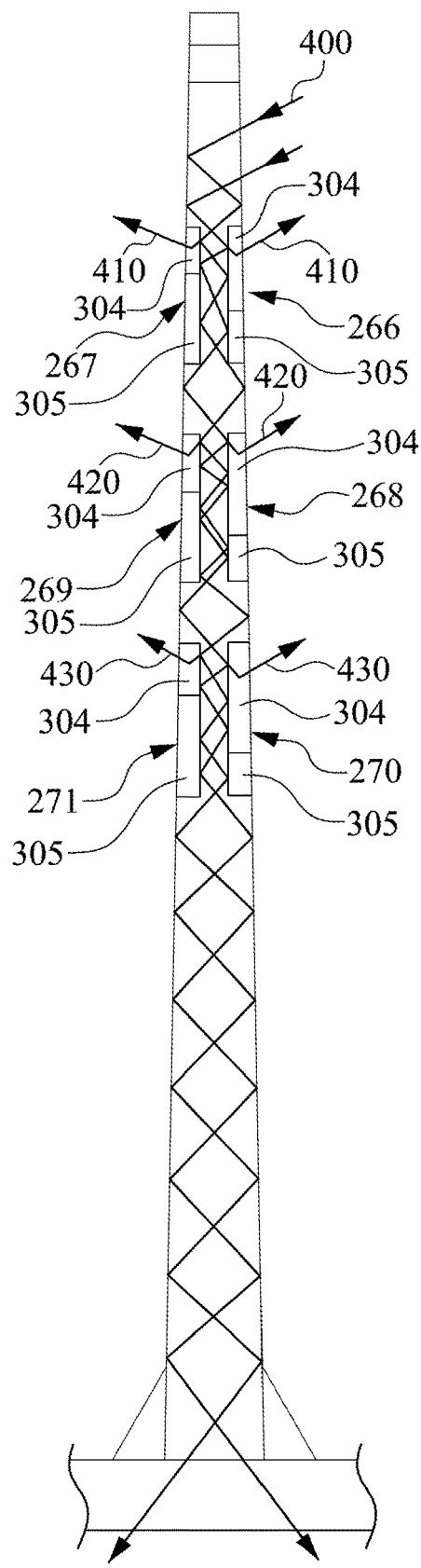
FIG. 4 illustrates an optical path diagram of a brightness enhancement support pin according to one embodiment of the present invention.

FIG. 1 illustrates an exploded diagram of a backlight module with support pins having brightness enhancement structures according to one embodiment of the present invention. FIG. 2 illustrates a perspective diagram of a support pin having brightness enhancement structures according to one embodiment of the present invention. FIG. 3 illustrates a dimensional diagram of the support pin having brightness enhancement structures and FIG. 4 illustrates an optical path diagram of the support pin having brightness enhancement structures according to one embodiment of the present invention.

Referring to FIG. 1, a backlight module 100 includes a back plate 110, a plurality of support pins 160 having brightness enhancement structures fixed on the back plate 110, a plurality of light bars 120 also fixed on the back plate 110, a reflective sheet 130 disposed on the back plate 110, and a plurality of optical films supported by the support pin 260, so the distance between the optical films and the back plate 110 can be kept.

The support pin 160 includes a board-shaped supporting section 164 and a supporting base 162, which is connected to the supporting section 164 and utilized to be fixed on the back plate 110.

The reflective sheet 130 includes a plurality of light source openings 132 to expose the light sources 122, for example, white light emitting diodes, of the light bar 120, and a plurality of support pin openings 134 to expose the supporting sections 164 of the support pins 160 such that the supporting sections 164 can protrude from the reflective sheet 130.

In some embodiments, the optical films include a diffuser 140 and a prism sheet set 150. In some embodiments, the prism sheet set 150 includes an upper prism sheet 154 and a lower prism sheet 152.

Further referring to FIG. 2, a plurality of grooves are formed on the supporting section 264 of the support pin 260 as the structures diffuse reflecting or refracting the light incident into the supporting section 264. The light incident into the supporting section 264 may leave the brightness support pin 260 from the plurality of grooves and thus the intensity of light which is reflected toward the supporting base 262 inside the supporting section 264 will be reduced. In some embodiments, some of the light incident to the supporting section 264 are reflected or refracted toward the tip of the supporting section 264 which contacts the diffuser 140.

Simultaneously referring to FIG. 2 and FIG. 4, the supporting section 264 includes a first surface 210 and a second surface 220, and the grooves are respectively formed on the first surface 210 and the second surface 220.

In some embodiments, the first surface 210 includes a first groove 266, a third groove 268 and a fifth groove 270, and a second surface 220 includes a second groove 267, a fourth groove 269 and a sixth groove 271.

In some embodiments, the first groove 266, the third groove 268 and the fifth groove 270 of the first surface 210 and the second groove 267, the fourth groove 269 and the sixth groove 271 of the second surface 220 are cross symmetrical.

In some embodiments, the first groove 266 is inclined from the upper right to the lower left as shown in FIG. 2 and FIG. 3, and the width 306 of the first groove 266 is about 0.5 millimeter (mm), and the distance 310 between the upper end 303 of the first groove 266 and the tip 301 of the supporting section 264 is about 3 mm.

In some embodiments, the first groove 266 is spaced apart from the edges of the two end surfaces 230 and 240 of the supporting section 264 by a predetermined distance 380 respectively, which is, for example, 0.5 mm. In addition, the vertical height 320 of the first groove 266 is about 2 mm. The abovementioned distances are not limited to the exemplary values and can be modified respectively without departing from the spirit and the scope of the invention.

In some embodiments, the second groove 267 is inclined from the upper left to the lower right on the second surface 220 at rear side of the supporting section 264 as shown in FIG. 2 and FIG. 3. Since the supporting section 264 is made of a light-transmitting material, the second groove 267 on the second surface 220 and the first groove 266 on the first surface 210 form a visible cross pattern. However, it should be noted that the second groove 267 and the first groove 266 are formed on the two opposing back surfaces, the first surface 210 and second surface 220, respectively. Similarly, the width 306 of the second groove 267 is about 0.5 mm, and the distance 310 between the upper end 303 of the second groove 267 and the tip 301 of the supporting section 264 is about 3 mm. Since the first groove 266 of the first surface 210 and the second groove 267 of the second surface 220 are cross symmetrical on the two opposing back surfaces, the support pins provide foolproof designs that still provide same optical characteristics after being rotated 180 degrees.

In some embodiments, the grooves and the supporting section 264 are integrally formed.

In some embodiments, the second groove 267 is spaced apart from the edges of two end surfaces 230 and 240 of the supporting section 264 by a predetermined distance 380 respectively, which is, for example, 0.5 mm. In addition, the vertical height 320 of the second groove 267 is about 2 mm.

In some embodiments, the third groove 268, the fourth groove 269, the fifth groove 270 and the sixth groove 271 are respectively spaced apart from the edges of two end surfaces 230 and 240 of the supporting section 264 by a predetermined distance 380 respectively, which is, for example, 0.5 mm.

In some embodiments, the width 306 of the third groove 268, the fourth groove 269, the fifth groove 270 and the sixth groove 271 are respectively about 0.5 mm.

In some embodiments, the vertical height 340 of the third groove 268 and the fourth groove 269 is 2 mm, and the vertical height 360 of the fifth groove 270 and the sixth groove 271 is also about 2 mm.

In some embodiments, the distance 330 between the third groove 268 and the first groove 266 is about 1 mm. The distance 350 between the third groove 268 and the fifth groove 270 is about 1 mm. The distance 330 between the fourth groove 269 and the second groove 267 is about 1 mm. The distance 350 between the fourth groove 269 and the sixth groove 271 is also about 1 mm.

In some embodiments, the depths of the first groove 266, the third groove 268, the fifth groove 270, the second groove 267, the fourth groove 269 and the sixth groove 271 are respectively 0.2 mm. The abovementioned distances are not limited to the exemplary values and can be modified respectively without departing from the spirit and the scope of the invention.

Followingly, the slopes of the first groove 266, the third groove 268 and the fifth groove 270 formed on the first surface 210 are different from each other as illustrated in the figures. The slopes of the second groove 267, the fourth groove 269 and the sixth groove 271 formed on the second surface 220 are also different from each other. When the emitted light is incident into the interior of the supporting section 264, the grooves with different slopes can effectively reflect or refract most of the incident light, which scatter the incident light. The grooves also provide the exits to leave the supporting section 264 for the incident light. Hence, the grooves can effectively scatter the transmission paths of the incident light and reflect or refract most of the incident light in the supporting section 264 such that most of the incident light exits the supporting section 264 through the grooves instead of being reflected toward the supporting base 262, so the intensity of the incident light transmitted to the supporting base 262 is reduced. In addition, the incident light exiting from the supporting section 264 is scattered and a part of the exiting light emits toward the tip of the supporting section 264, so the uniformity of brightness provided by the backlight module can be improved comparing to the traditional support pins, and the image quality of the liquid crystal display device can be benefited such improvement.

Hence, installing the support pins 260 having brightness enhancement structures in the backlight module can improve the brightness provided by the backlight module at the central positions of the support pins 260. The light intensities provided to the liquid crystal display panel are closer at the central positions of the support pins 260 and the nearby regions. Comparing to the prior art backlight module, the uniformity of the brightness can be increased by about 8%. For example, the luminance measuring instrument is utilized to measure the brightness at all positions of the backlight module with the support pins 260 installed. The brightness measured at the central position of the support pin area, corresponding to the tip of the support pin, is increased from 326.8 nits to 353 nits, which is closer to the average brightness, 358.6 nits, of the surrounding area. Under the same conditions, the brightness of the prior art backlight module with prior art transparent support pins installed is measured as about 326.8 nits at the central position of the support pin area, and the average brightness of the surrounding area is measured as about 357.5 nits. Because of the uneven brightness caused by the prior art transparent support pins, the prior art backlight module provides circular shadows on the liquid crystal display (LCD) panel at the positions corresponding to the prior art transparent support pins. When the screen size of the LCD panel is larger, more prior art support pins would be installed within the prior art backlight module and the dark shadows shown on the LCD panel would also increase and be more obvious. Therefore, the utilizing the support pins 260 with the brightness enhancement structures of the present invention can effectively improve the brightness uniformity of the backlight module by about 7.8% at the areas around the support pins 260, such that the dark shadows shown on the LCD panel can be effectively reduced and the image quality of LCD panel can thereby be greatly improved.

Simultaneously referring to FIG. 3 and FIG. 4, each of the grooves of the support pin 260 is formed with a lateral groove bottom surface 302, an upper side surface 304 and a lower side surface 305 according to some embodiments of the present invention. As illustrated in FIG. 4, because the support pin 260 supports the diffuser 140 within the backlight module, part of the emitted light is reflected by the diffuser 140 toward the top portion of the supporting section 264 and incident into the supporting section 264 of the support pin 260, which is the incident light 400. A part of the incident light 400 is reflected downwardly inside the support pins 260 and scattered by the lateral groove bottom surface 302, the upper side surface 304 and/or the lower side surface 305 of the first groove 266, so the incident light 400 is not totally reflected toward the back plate 110 inside the support pin 260. A part of the incident light 400, which is shown as the exiting light 410, is scattered to leave the support pin 260 diffusely and spread into the optical cavity of the backlight module. Since the exiting light 410 is scattered to spread out in all directions, the intensity of light emitted by the backlight module can be more uniformly distributed on the entire LCD panel. In addition, a part of the incident light 400 does not leave the supporting section 264 via the first groove 266 and still travels or is reflected downwardly inside the supporting section 264. Because the supporting section 264 further includes structures, such as the second groove 267, the third groove 268, the fourth groove 269 and/or the fifth groove 270, formed on the surfaces of the supporting section 264 with different slopes, the aforementioned part of the incident light 400, which travels or is reflected downwardly inside the supporting section 264, may be scattered by these structures, so the exiting light 420 and the exiting light 430 can be formed from the part of the incident light 400 as illustrated. Therefore, most of the intensity of the incident light 400 is distributed out of the supporting section 264 evenly as the exiting light being refracted or reflected diffusely into the optical cavity of the backlight module. Hence, compared with the prior art support pins which concentrate the incident light toward the back plate, the support pins 260 of the present invention can effectively reduce the intensity of the incident light distributed toward the supporting base and the back plate, and the brightness provided at the positions of the LCD panel contacted by the support pins 260 can be effectively increased, such that the light emitted by the backlight module is more uniformly distributed to entire LCD panel.

In some embodiments, a part of the exiting light 410, the exiting light 420 and/or the exiting light 430 is reflected or refracted by the support pins 260 or the reflective sheet 130 toward the tip of the supporting section 264. The brightness provided at the positions where the brightness enhancement support pins 260 contact the diffuser is thereby increased, and the luminance provided by the light emitted from the backlight module can be more uniformly distributed on the entire LCD panel.

In addition, the cross symmetrical grooves are formed on the first surface 210 and the second surface 220 of the support pin 260 respectively, and the emitted light within the backlight module is scattered by the groove structures of the support pins 260. The amount of the groove structures formed on each of the support pins 260 can be increased and not limited to the abovementioned embodiments, and the groove structures can be designed with shallower depth and smaller width without any penetration that may destruct the structural integrity of the support pin 260, so the structural strength of the support pin 260 will not be damaged by the increased groove structures. In some embodiments, because the terminals of the first groove 266, the second groove 267, the third groove 268, the fourth groove 269, the fifth groove 270 and the sixth groove 271 are apart from the end surfaces 230 and 240 of the supporting section 264 a distance, i.e. 0.5 mm, without penetrating the supporting section 264, so the support pin 260 is not penetrated by the groove structures. Therefore, the defect that the groove structures may weaken the structural strength of the support pins can be effectively prevented.

In some embodiments, as shown in FIG. 3, the upper ends 303 of the first groove 266, the second groove 267, the third groove 268, the fourth groove 269, the fifth groove 270 and the sixth groove 271 are flat shaped. However, as shown in FIG. 2, the end portions of the first groove 266, the second groove 267, the third groove 268, the fourth groove 269, the fifth groove 270 and the sixth groove 271 can also be curved shaped to form curved terminals without departing from the spirit and the scope of the invention. The curved terminals may provide better structural strength and better light scattering capability for the support pins 260. In some embodiments, the groove structures are integrally formed with the support pins 260 during the production process of the support pins 260. For example, the mold of the injection molding process has structures corresponding to the groove structures, so the groove structures are directly formed on the support pins during the injection molding process. Such mass production process can provide the support pins having brightness enhancement structures of the present invention and does not require subsequent machining or working after the support pins are produced, so the production difficulty can be reduced and the yield of producing the support pins can be improved.

Accordingly, the support pins with the groove structures can effectively reduce the intensity of the incident light which is reflected toward the supporting base, thereby the shadows caused by the prior art support pins can be avoided and the image quality of the backlight module and the liquid crystal display can be improved.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A support pin supporting at least one optical component in an optical cavity, comprising:
a supporting base; and
a supporting section made of a light-transmitting material connecting the supporting base, wherein a plurality of grooves are integrally formed on surfaces of the supporting section, wherein the grooves reflect or refract part of incident light transmitted inside the supporting section diffusely and the grooves do not penetrate through the supporting section, wherein the supporting section comprises a first surface and a second surface, and the grooves are respectively formed on the first surface and the second surface, wherein the grooves formed on the first surface of the supporting section cross symmetrically with the grooves formed on the second surface of the supporting section when viewed from a side view of the supporting section.

2. The support pin of claim 1, wherein the part of the light rays is reflected or refracted in the interior of the supporting section by the grooves and exits the supporting section toward a supporting section tip of the supporting section.

3. The support pin of claim 1, wherein the first surface comprises a first groove, a third groove and a fifth groove, and the second surface comprises a second groove, a fourth groove and a sixth groove.

4. The support pin of claim 1, wherein the grooves are respectively spaced apart from an end surface of the supporting section by a predetermined distance.

5. The support pin of claim 1, wherein the grooves comprise curved groove terminal portions.

6. The support pin of claim 1, wherein the grooves formed on the first surface have different respective slopes.

7. A backlight module, comprising:
a back plate;
a plurality of support pins, each of the support pins comprising a supporting base and a supporting section made of a light-transmitting material connecting the supporting base, wherein a plurality of grooves are integrally formed on surfaces of the supporting section, wherein the grooves reflect or refract part of incident light transmitted inside the supporting section diffusely and the grooves do not penetrate through the supporting section; and
a plurality of optical films, wherein the optical films are supported by the support pins that a distance is kept between the optical films and the back plate, wherein the grooves formed on one of the surfaces of the supporting section have different respective slopes.

8. The backlight module of claim 7, wherein the optical films comprise a diffuser and a prism sheet set.

9. The backlight module of claim 8, wherein the prism sheet set comprises an upper prism sheet and a lower prism sheet.

10. The backlight module of claim 7, wherein the supporting section comprises a first surface and a second surface, and the grooves are respectively formed on the first surface and the second surface.

11. The backlight module of claim 10, wherein the grooves formed on the first surface of the supporting section cross symmetrically with the grooves formed on the second surface of the supporting section when viewed from a side view of the supporting section.

12. The backlight module of claim 7, wherein the grooves include curved terminal portions.

13. A display device, comprising:
a display panel;
a plurality of optical films; and
a backlight module comprising a back plate, a plurality of light sources and a plurality of support pins, the light sources located between the support pins, each of the support pins comprising a supporting base and a supporting section made of a light-transmitting material connecting the supporting base, wherein a plurality of grooves are integrally formed on surfaces of the supporting section, wherein the grooves reflect or refract part of incident light transmitted inside the supporting section diffusely and the grooves do not penetrate through the supporting section;
wherein the optical films are supported by the support pins that a distance is kept between the optical films and the back plate.

14. The display device of claim 13, wherein the supporting section comprises a first surface and a second surface, and the grooves are respectively formed on the first surface and the second surface.

15. The display device of claim 14, wherein the grooves formed on the first surface of the supporting section cross symmetrically with the grooves formed on the second surface of the supporting section when viewed from a side view of the supporting section.

16. The display device of claim 13, wherein the grooves include curved terminal portions.

17. The display device of claim 13, wherein the grooves formed on one of the surfaces of the supporting section have different respective slopes.

* * * * *